United States Patent [19]
Such

[11] Patent Number: 5,457,751
[45] Date of Patent: Oct. 10, 1995

[54] ERGONOMIC HEADSET

[76] Inventor: Ronald W. Such, P.O. Box 1041, Portsmouth, N.H. 03802-1041

[21] Appl. No.: 79,131

[22] Filed: Jun. 18, 1993

Related U.S. Application Data

[63] Continuation-in-part of Ser. No. 821,181, Jan. 15, 1992, abandoned.

[51] Int. Cl.$^6$ ..................................... H04R 25/00
[52] U.S. Cl. ........................ 381/183; 381/187; 348/115
[58] Field of Search ............................. 381/183, 187, 381/68.6, 68.7, 205, 188, 68.5, 183, 187; 379/430; 455/89, 90, 351; 358/103, 104, 109

[56] References Cited

U.S. PATENT DOCUMENTS

| | | | |
|---|---|---|---|
| 1,581,882 | 4/1926 | Stcace . | |
| 2,566,313 | 9/1951 | Cates | 381/187 |
| 2,611,831 | 9/1952 | Cates . | |
| 3,457,565 | 7/1969 | Simpson et al. | 381/183 |
| 4,357,711 | 11/1982 | Drefko et al. | 455/351 |
| 4,539,708 | 9/1985 | Norris | 455/100 |
| 4,571,746 | 2/1986 | Görike | 381/183 |
| 5,003,300 | 3/1991 | Wells | 358/103 |
| 5,033,094 | 7/1991 | Hung | 381/183 |
| 5,130,794 | 7/1992 | Ritchey | 358/87 |

Primary Examiner—Curtis Kuntz
Assistant Examiner—Huyen D. Le
Attorney, Agent, or Firm—William B. Ritchie

[57] ABSTRACT

Headset framework apparatus designed to be worn around the back of the head, and supported, in part, by the ears of the user, and, in part, by the nape, or back of, the user's neck. The framework and support means of the apparatus, is preferably, substantially U-shaped, and may be further shaped, such that it generally conforms to the user's neck and head. At least one integral, or detachable, speaker means is provided, which extends from the framework and support means, proximate to the ear of the user. A microphone may also be provided, if desired. Visual display means attached to the framework are also provided. Also, electronic component means, may be integral with, or removably attachable to, the nape supported member of the framework and support means, or may be located at other than the site of the headset framework apparatus, and operatively connected thereto.

18 Claims, 7 Drawing Sheets

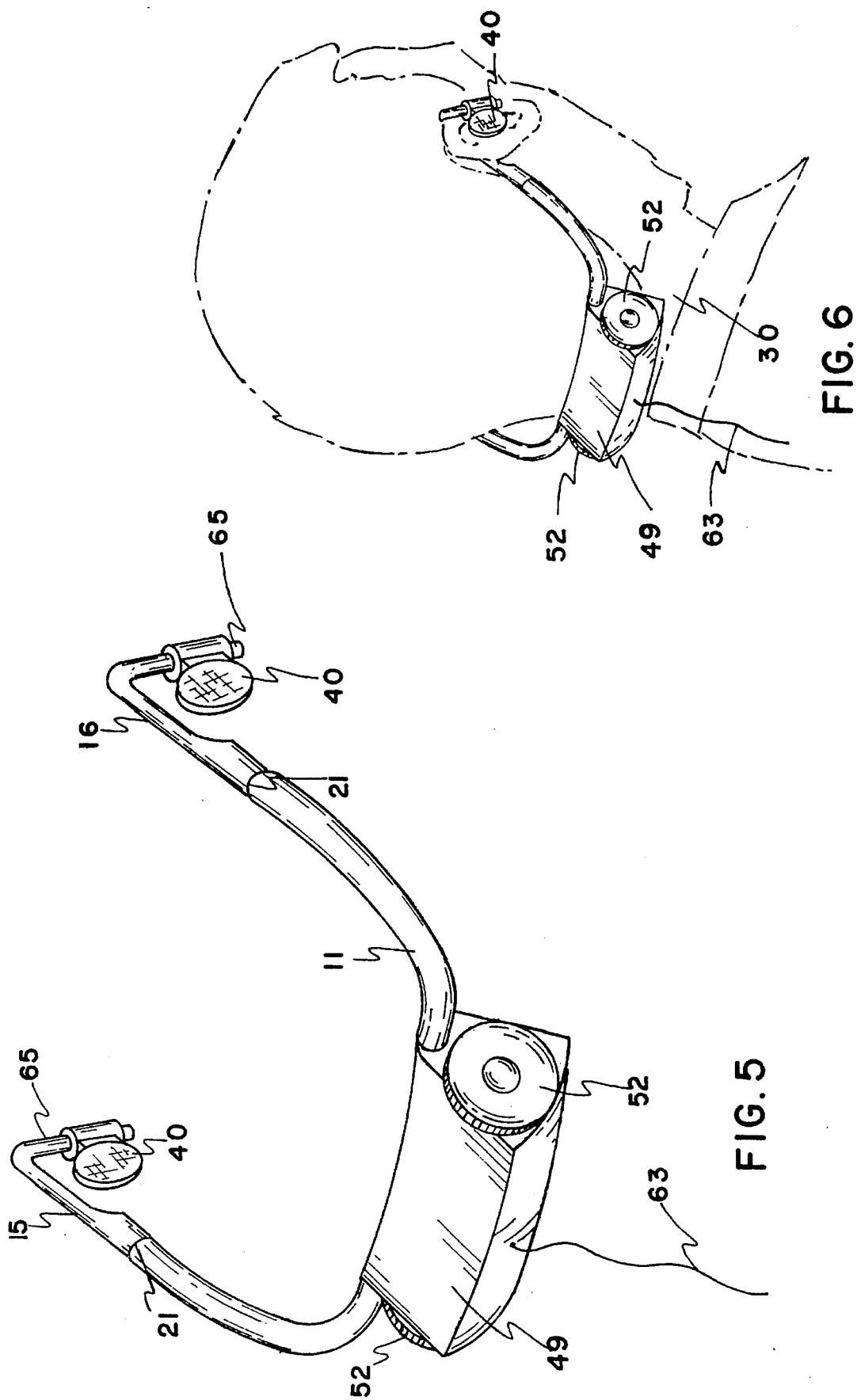

ERGONOMIC HEADSET

This is a continuation-in-part of the U.S. application Ser. No. 07/821,181 filed Jan. 15, 1992, now abandoned.

BACKGROUND OF THE INVENTION

1. Field of the Invention

The invention relates to headsets in which the framework and support means are rear-mounted on the back of the user's neck.

2. Description of the Related Art

It is a major problem in the field of headsets, to devise an apparatus which does not, over time, create pressure upon the ears of the user, thereby causing significant discomfort. Heretofore, in the conventional clamping types of headset apparatus, the speakers themselves attach, or press on the ears, connected by a tensioned band that rests over the top of the head of the user. Speaker contact with the ears is an essential factor of support for this type of conventional apparatus. The clamping pressure on the ears, which holds the headset in place, is not only uncomfortable and tiring, but the apparatus is not held securely, upon movement of the head. When the user bends down, looks up, or moves about, somewhat energetically, this conventional type of headset apparatus tends to dislodge. The inherent instability in this type of device is due to a substantial portion of the head set frame being located distant from the center of rotation of the head and the use of the ears as a primary support for the frame. Generally, the over-the-head measurement from ear to ear is 1.4 to 1.6 times the back-of-the-head distance. Further, a headset framework that coincides with the smaller back-of-the-head measurement will have a moment of inertia centered closer to the point in the human body that confers the greatest range of combined three axis movement, that is, nodding the head backward and forward, tilting left and right, and rotation left and right. This point is coincident with the axis vertebra in the cervical region of the neck.

The head band of conventional headsets rests on the top of the head. This position maximizes inertial forces on the headband due to head movement and is inherently unstable.

Another type of conventional headset apparatus is one utilizing plug-type earphones, connected by a U-frame which hangs under the chin. These headsets are supported at the ear canal by tension in the U-frame, which pushes the earpieces into the ear canal. The ear canals must support the weight of the U-frame, as in a stethoscope. They are very irritating to the ear canals, when the U-frame is bumped by the user, or when the audio cable, connected to the U-frame, is tugged. Movement of the user's head forward or backward, or movement of the head, left or right, causes the earpieces to rotate in the ear canal in the first case, or produces differential pressure on the ear canal, when the U-frame touches the shoulder, in the second case. Both effects are caused by the rigidity of the hanging U-frame, which transmits these pressures to the ear canal.

The under-chin, plug-type, headset apparatus, is also objectionable, because its rigid U-framework configuration and wiring in the front, oftentimes gets in the way of the user. It is important for pilots, or headset apparatus users, such as users of WALKMAN-type systems, to have a comfortable configuration, which enables extended headset wear, as well as stability of attachment, and freedom of movement in the front of the user. Additionally, the prior art designs of headset apparatus, are highly incompatible with the simultaneous use of other headgear, such as hats, helmets, oxygen masks, and the like.

U.S. Pat. Nos. 2,566,313 and 2,611,831, issued to Cates, disclose a behind the head type of headset which is supported by the two ears. While Cates discloses a headset that moves the headset to a position closer to the center of rotation of the user's head, it still uses only a two-point support method and is limited to acoustic tube sound delivery.

United Kingdom Patent No. 602,379 discloses another headset that features earpieces having ear-hooks. An alternative embodiment shows the ear-hooks connected by a neck band. However, as in the Cates disclosure, the device is still supported only by the user's ears.

U.S. Pat. No. 1,581,882 discloses a headset apparatus which hangs under the chin yet does not rely on the plug-type earphones. This apparatus supports the earpiece at the ears with a loop adapted to fit over the ears. However, this design also has the wiring running in front of the user. This creates a loss of freedom of movement in the front of the user, and does not provide for a stable headset.

Design U.S. Pat. No. 229,312 is another example of a headset which loops around the ears. Although not specifically indicated in the patent, the shape of the framework requires that it hang under the user's chin. The '312 headset design supports the frame on only the user's ears, thereby, not providing the stability needed to prevent the headset from dislodging when the head is moved.

Another design, the Q15, manufactured by AKG Audio Communication, discloses a headset design that features ear supports that loop forward and below the ears and then join around the back of the user's head. Again, this device relies solely on the user's ears as the support for holding the device to the head.

Also, another recurring problem is that electronic components are not ergonomically integrated with, or attachable to, conventional headset frameworks. Incorporating the extra weight and bulk of these electronic components increases pressure upon the ears, magnifies undesirable inertial effects, and further decreases the security of adherence to the head.

Nothing in the prior art provides for an ergonomically designed headset framework that enables the user to wear the headset for long periods of time comfortably while providing a secure fit that will prevent the headset from dislodging under the range of motions possible during use.

SUMMARY OF THE INVENTION

It is an object of the invention to provide a headset framework that is comfortable for the user to wear over extended periods of time.

It is another object of the invention to provide a headset framework that is highly stable, and does not come loose upon head movements by the user, and is highly compatible with the simultaneous use of other headgear.

It is still another object of the invention to provide a headset framework that can carry all types of audio and visual devices, either alone or in combination with one another.

It is still another object of the invention to provide a headset framework that can ergonomically carry all types of audio and visual electronic components.

It is a further object of the invention to provide a headset framework that provides a three point support method, utilizing the ears and the nape of the neck.

The invention is an ergonomic headset for carrying audio and visual devices on a user's head. A left ear supported member, having anterior and posterior ends, is provided. The left ear supported member has a first left surface shaped to conform to the cleft between the left auricle and the temporal bone region of the user's head. The surface extends anterio-inferiorly around the helix of the user's ear, at the forward end of the cleft. The device also has a right ear supported member, having anterior and posterior ends. The right ear supported member has a first right surface shaped to conform to the cleft between the right auricle and the temporal bone region of the user's head. The surface extends anterio-inferiorly around the helix of the user's ear, at the forward end of the cleft.

A nape supported member, having left and right ends continuous with the corresponding posterior ends of the left and right ear supported members, is provided. The nape supported member has a nape surface shaped to conform to the user's neck region dorsal to the axis vertebra of the user. Resiliency means is provided in the nape supported member for urging the left and right ear supported members snugly against the corresponding left and right temporal regions of the user.

Adjustment means operative between at least one ear supported member and the nape supported member is provided. Adjustments means adjusts the headset framework length between the ears and the nape of the neck, so that the headset framework will fit snugly on the user's head, supported by the auricle clefts and the nape of the user's neck. Device connecting means for carrying the audio visual device is provided. Device connecting means is secured to at least one of the left and right ear supported members.

BRIEF DESCRIPTION OF THE DRAWINGS

FIG. 5 is an isometric view of the headset framework with an integral electronic component.

FIG. 6 is an isometric view of the headset of FIG. 5 as fitted to the individual.

DETAILED DESCRIPTION OF THE INVENTION

Figure 2:
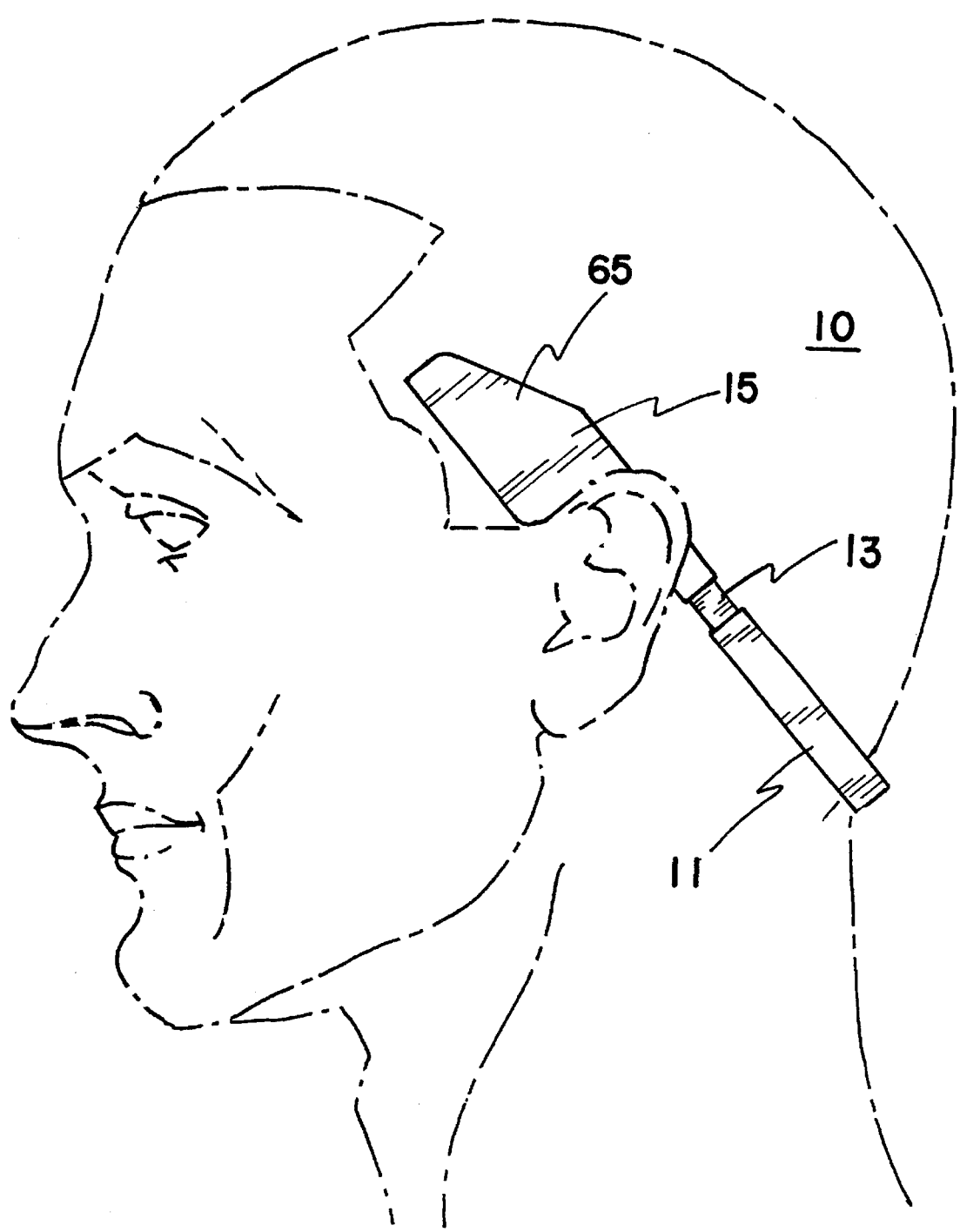
FIG. 2 is an isometric view of the headset framework of FIG. 1 being worn by an individual with the audio devices removed.

The present invention provides an integral framework and support means, not requiring pressure on the ears, for a headset framework apparatus, which is self-supporting, even when no audio visual devices are attached (See FIG. 2).

Thus, when earphones, speakers, microphones, visual displays or other devices are attached, or even when they are integrated within the framework, such devices do not exert any pressure on the user in order to maintain the position of the headset framework on the user. The following discussion will illustrate representative uses of the novel headset framework with a few of the large number of possible permutations and combinations of electronic and optical devices and components. The term "device" as used herein means any user/headset interface structure capable of receiving voice or other human input such as pupil position and/or capable of supplying output to the ears and eyes. For example, a microphone, an earphone, earpiece, a mirror, a lens, a liquid crystal display, etc. The term "component" as used herein means any structure capable of processing the input/output of a device as defined above and not necessarily interfacing directly with the user. For example, a radio, a vcr, a television, a stereo, a computer, etc.

The numbers of devices and components that are designed to be worn on the user's head is increasing almost daily. From the humble beginnings of simple earphones and microphones, the list of electronic and optical(hereinafter "electrooptical") apparatus designed to be worn on the head of the user now includes binoculars, am-fm receivers and transmitters, tape players and recorders, televisions with virtual vision capabilities, cordless infrared receivers, camcorders, hi-intensity medical lights, microscopes for delicate surgery, miniature stereo speakers, liquid crystal monitors, computer interfaces, laser weapon sights and so on. Other electro-optical apparatus, such as VIRTUAL VISION, a television or video player that has a see-through virtual image screen worn in front of the viewer's eyes, is designed to have the visual device worn on the head with the necessary electronic components on the belt. As miniaturization in electronics continues to progress, additional devices and components, such as eye-controlled computers to effect a variety of tasks from surgery to word processing will be commonplace. The invention disclosed, herein, is capable of supporting any such structure that is to be worn on the head of the user.

Figure 1:
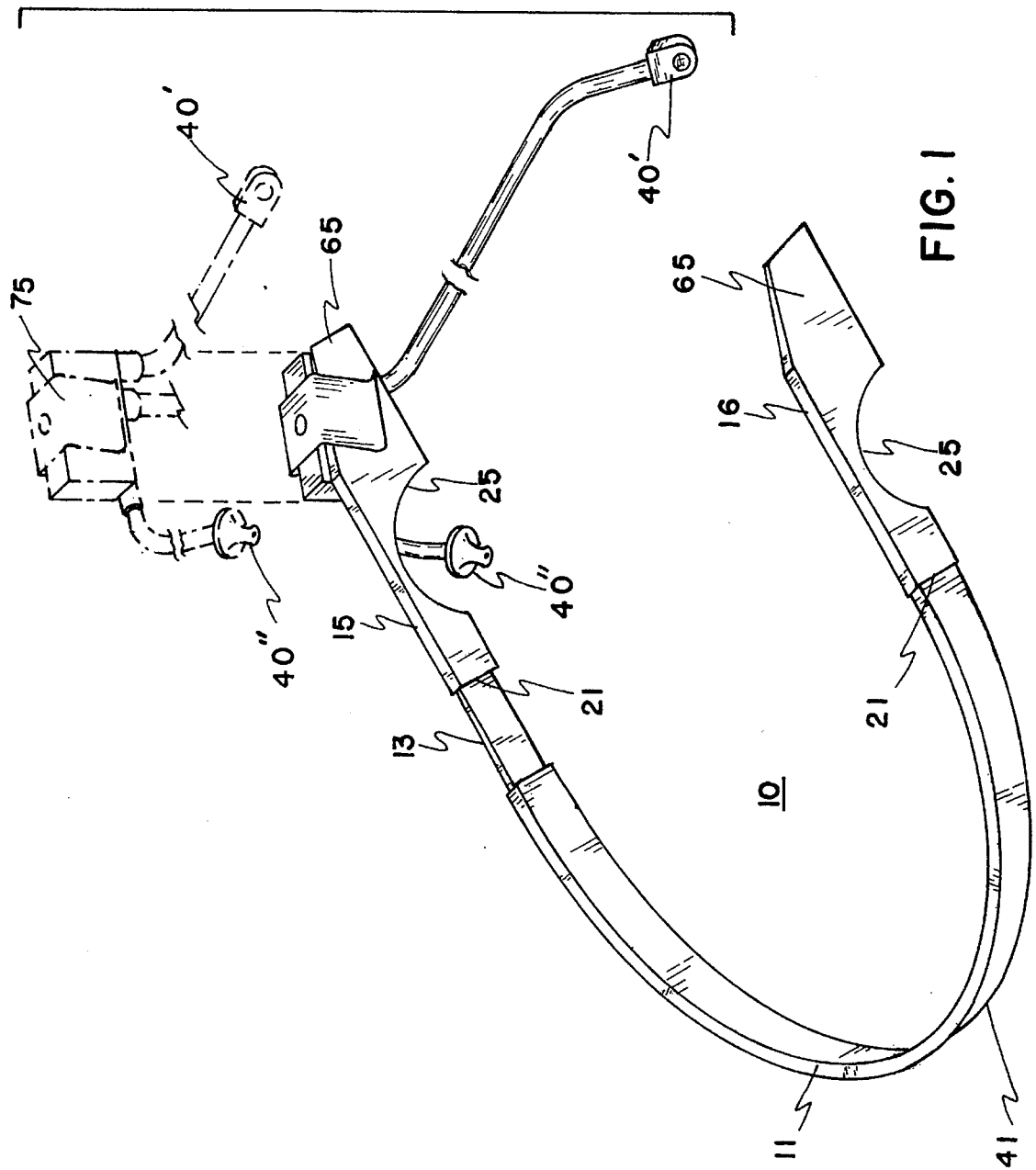
FIG. 1 is an isometric view of the headset framework with a pilot's earpiece and microphone attached via clip on mechanism in accordance with the invention.

FIG. 1 is an isometric view of the headset framework with a pilot's earpiece 40" and microphone 40' set attached via clip 75 on ear supported member 15. This type of set is used by every major airline in the U.S. The earpiece can be either custom fit or different sized earpieces of silicone rubber can be used to achieve comfort. Note that the audio devices are not a part of the support structure of framework 10.

The framework features a unique three-point support utilizing the user's ears and nape of the neck. As noted above, the back-of-the-head measurement from ear to ear is only about two thirds of the over-the-head measurement. Also, by centering at the nape of the neck, it then becomes possible to concentrate as much mass of the headset framework and attached electro-optical components as close as possible to the quiescent point, the axis vertebra.

Nape member 11 features a surface 41 that is shaped and dimensioned to correspond to the region dorsal to the axis vertebra of the user's neck. Nape supported member 11 is preferably composed of a resilient material.

The remaining two points of support are provided by left ear supported member 15 and by right ear supported member 16. Surfaces 25 extend anterior-inferiorly around the helix of the user's ear, at the forward end of the cleft between the auricle and the temporal bone region of the user's head.

Since members 15, 16 can be moved independently from one another as shown, framework 10 can be adjusted accurately to accommodate ear-to-nape-of-neck distance of the wearer, even when such length varies from ear to ear.

In this manner, framework 10 is extremely stable when in position even when subjected to head movements that would cause an ordinary headset to be dislodged.

The left and right ear supported members 15, 16 extend from the nape supported member 11, generally parallel, or at a slight angle, from the termini of member 11, in order to support framework 10, on both user's ears from behind.

Adjustably connecting ear supported members 15, 16 to member 11 are a pair of resilient bands 13 (partially shown between member 15 and 11 only), which urges members 15, 16 gently against the temporal region of the user's head to further provide positional stability.

Also, bands 13 provide adjustability to account for differences in the measurement from one ear to the nape of the neck versus the distance from the other ear to the nape of the neck. The preferred embodiment shows internal "spring-like" bands 13 housed within members 11, 15, 16. However, an alternative embodiment would be to replace bands 13 with resilient tubes fitted to the exterior of members 11, 15, 16. This alternative would also be acceptable as long as the desired resiliency and adjustability requirements were met. Another alternative is to make members 11, 15 and 16 themselves resilient and to have either members 15, 16 slide over member 11 to provide adjustment or to have member 11 slide over members 15, 16.

The posterior ends 21 of members 15, 16 preferably correspond in size and shape with member 11 as shown. However, use of framework 10 to support different audio visual devices may require configurations where member 11 is greater than or smaller than members 15, 16 in the region of ends 21.

In this variation, the anterior ends 65 of ear supported members 15 and 16 are adapted to accommodate clip mechanism 75 which releasably attaches the audio devices to framework 10. Since both of ear supported members 15 and 16 are so adapted, it is possible for the user's to place the audio devices or either side of the head, thereby permitting the free ear to be nearest an adjacent crew member.

FIG. 2 is an isometric view of the headset framework of FIG. 1 being worn by an individual with the devices removed. As discussed above, the audio devices are not necessary for the headset framework to be held secure on the user.

Figure 3:
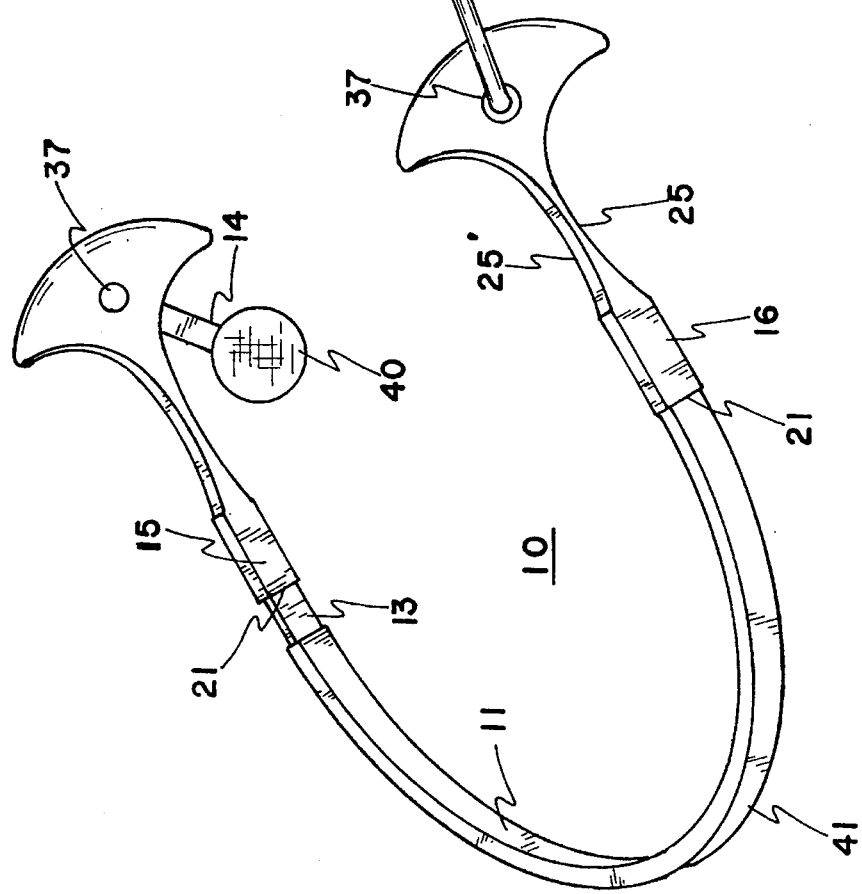
FIG. 3 is an isometric view of an alternative embodiment of the headset framework, adapted for situations requiring an "ambi-sided" headset.

FIG. 3 is an isometric view of an alternative embodiment of the headset framework, adapted for situations requiring an "ambi-sided" headset. The term "ambi-sided" means that the headset framework can be worn such that the earphone and/or microphone can be on either side of the head. This embodiment is particularly useful for aircraft crew members since the pilot and co-pilot must be able to talk to one another without an earphone blocking the ear closest to the co-crew member. However, any situation where a "free" ear is required, but not always the same ear, could utilize this embodiment. Note that the microphone 40' and earphone 40 are shown on opposite ear supported members. However, microphone 40' and earphone 40 could just as easily be both located on the same ear supported member with the other ear supported member supporting another device, such as a rear view mirror or computer interface display.

Surfaces 25' are in the same plane and 180 degrees opposite to surfaces 25, as a vertical mirror image of the opposing surface. Thus, this embodiment allows interchangeable use of the headset for left and right ear phone and microphone placement.

On each ear supported member 15, 16 is a pivot attachment 37. Pivot attachment 37 attaches earphone 40 to member 15 and microphone 40' to member 16, respectively. As previously mentioned, devices do not have to be touching the user's ear or ear canals in order to support framework 10 on the user's head, thus providing a great improvement in comfort. Since earphone 40 and microphone 40' do not participate in positioning framework 10 on the user's head, they can be easily adjusted to a position that is most comfortable for the wearer. In this case, earphone 40 is comfortably worn close to the user's ear with little pressure from framework 10 being exerted thereon. Also, since framework 10 is extremely stable when worn, normal head movements will not translate force from framework 10 to earphone 40.

The framework 10 and its microphone 40' and earphone 40 are ambi-sided and worn with either the earphone 40 on the left and microphone 40' on the right or vice versa. Microphone 40' and earphone 40 are preferably centrally located on members 15 and 16 and rotatable. Therefore, framework 10 can easily be adjusted to have earphone 40 cover the left ear with microphone 40' extending from that part of framework 10 supported by the right ear or vice versa.

Microphone 40' is connected to framework 10 via a boom 12 attached to pivot attachment 37. This allows for microphone 40' to be placed an appropriate distance from the user's mouth. Earphone 40 is connected to framework 10 via connecting extension 14 which enables earphone 40 to be positioned over the ear canal to facilitate maximum sound transmission.

Although audio devices are shown attached to framework 10 in this variation, other devices could be easily substituted. For example, if a mirror was attached to the end of boom 12, this variation would serve as a combination rear view mirror and audio listening device.

For example, if framework 10 was used for a bone conduction type of hearing aid, one or perhaps both of members 15, 16 would be enlarged and shaped in the region of ends 21 to house the electronics and sound vibration transducer mechanism that would contact the user's mastoid bone to provide simulated sound through bone conduction to the inner ear.

On the other hand, if an electronic component is integral with framework 10 such as that shown in FIG. 5, member 11 will be dimensioned accordingly. While the respective sizes and shapes of members 11, 15, 16 will be altered to accommodate the various electronic components or electro-optical devices attached to and incorporated therein or thereon, the basic structure of the framework remains the same. Left and right ear supported members adjustably and resiliently connected to a nape supported member with one or more device/component connection structures incorporated or attached to one or more of the supported members is the essence of the invention. Thus, the invention is extremely flexible and is able to accommodate virtually any type of audio or visual device or component that is to be worn by a user.

Figure 4:
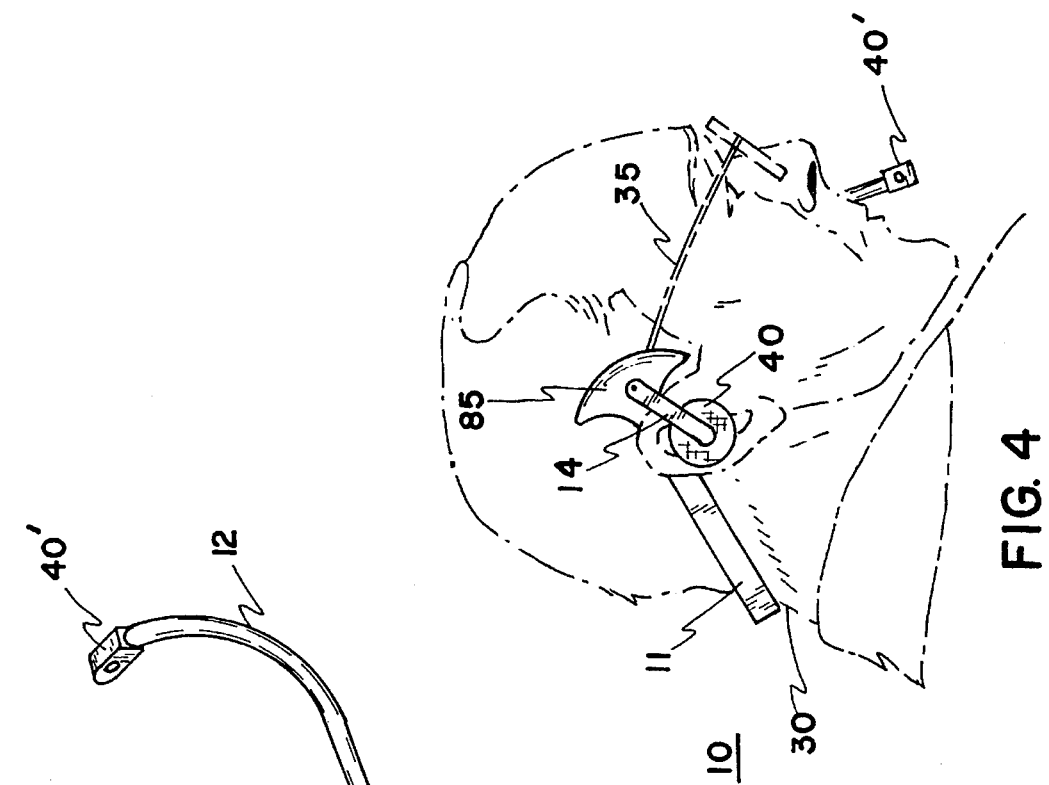
FIG. 4 is an isometric view of the headset framework shown in FIG. 3 as fitted to the individual with the audio devices.

FIG. 4 also shows that framework 10 can be used even when the user is wearing eyeglasses 35. Framework 10 is supported by the user's neck by nape supported member 11, right ear supported member 16 and left ear supported member 15 (not shown). Also, any added wiring, or cable (not shown), is preferably attached to the back of the nape supported member 11 and internally connected through framework 10 to relevant components and devices, where it does not interfere with the front of the user. The present invention is, therefore, highly compatible with the simultaneous use of any audio visual device or electronic component that is to be placed on or associated with a headset. Like the earlier embodiment, this framework is also generally of a U-shaped configuration supported by the nape of the neck and both ears of the user when worn. The nape supported member 11 has a surface 41 conformal with the neck region and dorsal to the axis cervical vertebra of the user. An ear cleft engaging segment 85 is found at each of the two general extremities of the framework. The ear cleft engaging segment 85 covers the ear region and extends forward beyond the ear. This inhibits rearward displacement of the framework on the user's head. The user input/output means, in this case, earphone 40 is located on at least one ear cleft engaging segment 85.

FIG. 5 is an isometric view of the headset with an integral electronic component 49 as part of nape supported member 11. This variation would be ideal for a radio receiver or transmitter, well known in the art, or as miniaturization improves, other units such as tape players and recorders, computer processing and memory storage units, CD's, etc. The electronic component utilizes control knobs 52 oriented in the sagittal plane relative to said user. For use as a radio, one control knob adjusts the power and volume and the second tunes the frequency. A flexible antenna 63 extends distally from component 49.

With most conventional headset frameworks adapted to support a radio or other devices, the increased weight decreases the stability of the headset in that additional weight on the head-spanning band provides a greater moment about the axis of rotation, tending to induce dislodging of the headset when the head is moved. However, with the invention, stability is actually increased, since the increased weight of device 49 is very close to the axis vertebra of the wearer, resting at the stable axis point at the back of the user's neck.

Earphones 40 are designed to be swiveled about the adapted anterior ends 65 of ear supported members 15, 16. This adaptation of ear supported members 15, 16 shows how easily the headset framework 10 can be modified to accommodate a wide range of devices. Thus, earphones 40 can be positioned close to the user's ears, but without necessarily touching, which might cause discomfort.

FIG. 6 is an isometric view of the headset of FIG. 5 as fitted to the individual. The added weight of electronic component 49, at the axis point, or the back of the neck 30, can provide additional overall stability to the headset. Further, the "wedge" shape of device 49 is designed to conform to the nape of the user's neck so that the head may be tipped backwards without interference from device 49. The left and right ear supported members 15, 16 rest on the ears as comfortably as would eye glasses.

Figure 7:
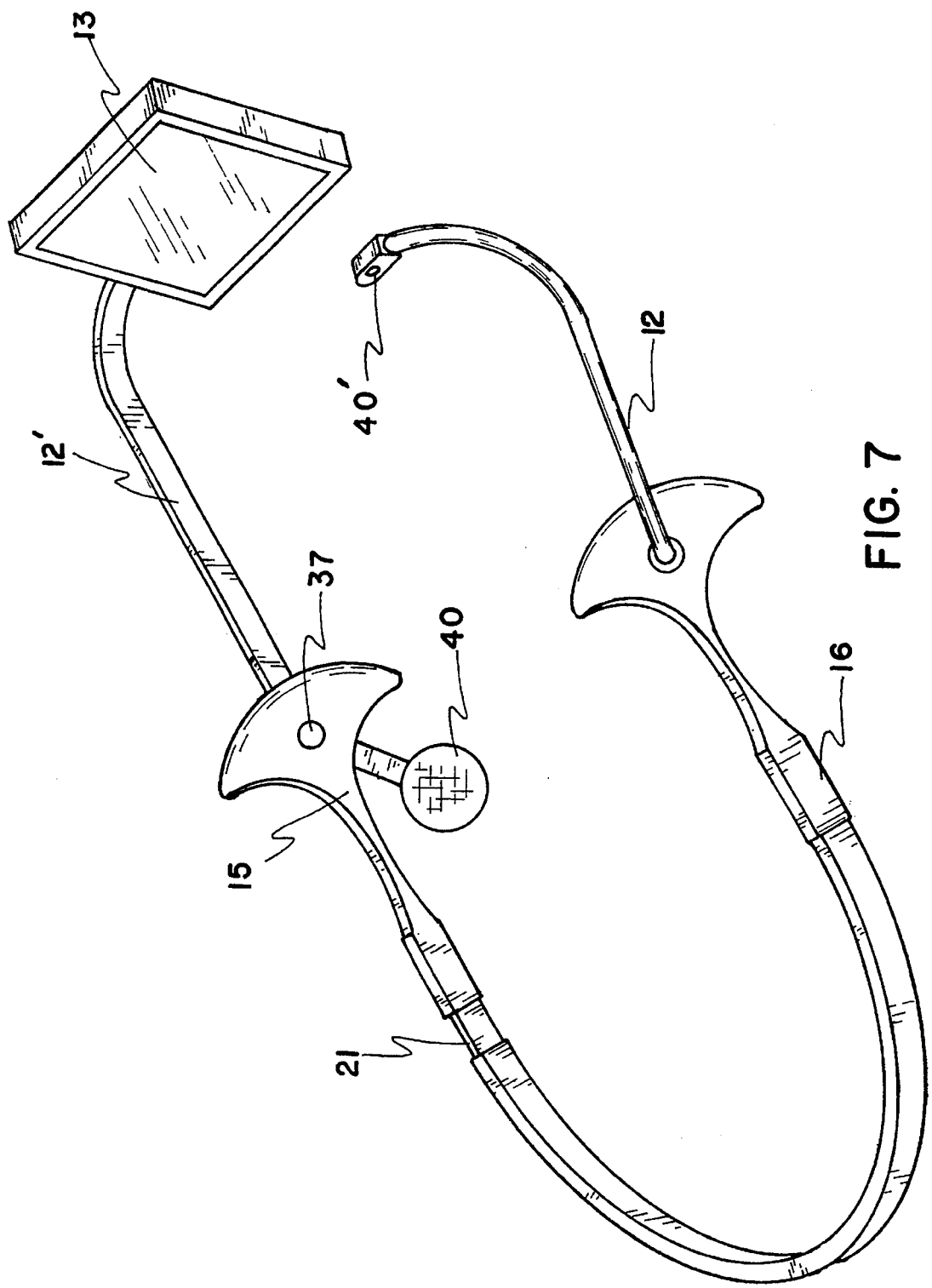
FIG. 7 is an isometric view of the headset framework of FIG. 3 with a visual device attached.

FIG. 7 is an isometric view of the headset framework of FIG. 3 with visual device 13 attached via a second boom 12'. Device 13 could be a simple mirror where the user of headset framework needs to watch events taking place behind him/her. Also, device 13 could be a screen so that the operator can still see what is in front of him/her yet monitor other events as well. This would be ideal for an air traffic controller who needs to watch for planes from the tower, monitor a wearable headset radar screen and maintain communications with aircraft simultaneously. As mentioned above, this embodiment of framework 10 is ambi-sided. Also, device 13, earphone 40 and microphone 40' could be all on the same side or split as shown. Since device 13 is attached to framework 10 via pivot attachment 37, then it is possible to move device 13 up over the user's head if an unobstructed view is required.

Figure 8:
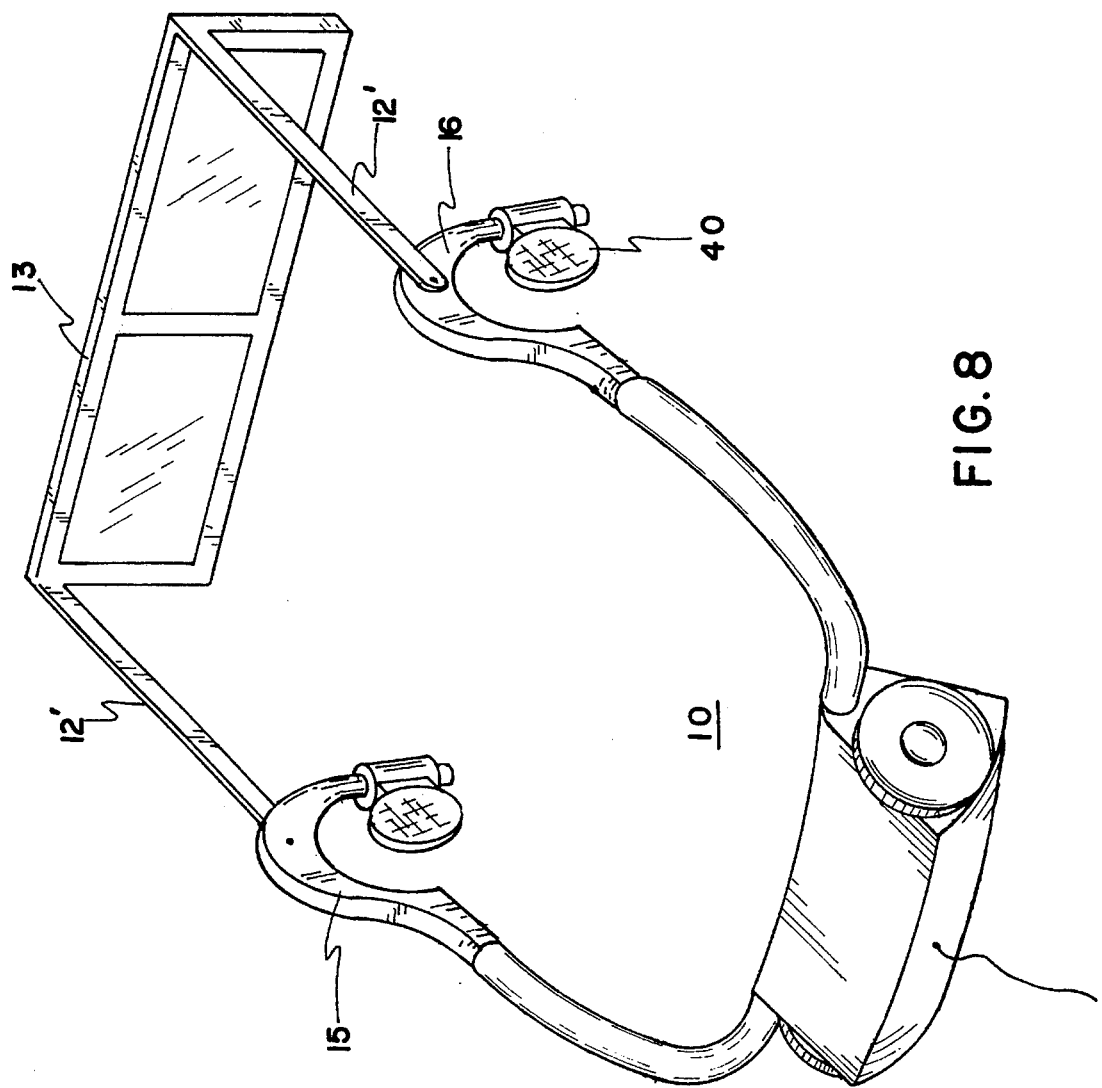
FIG. 8 is an isometric view of the headset framework with an integral electronic component, speakers and a viewing screen.

FIG. 8 is an isometric view of the headset framework with an integral electronic component, speakers and a viewing screen. This variation shows how conveniently the invention can be adapted to carry the latest electronic wizardry such as VIRTUAL VISION personal projection television that is worn on the head. The VIRTUAL VISION apparatus uses an active matrix color display in combination with a transparent reflective surface and lens to project a virtual image that appears about ten feet in front of the user. In this variation, component 49 could house some or all of the electronics for the television/vcr apparatus. Earphones 40 would provide stereophone sound while the user watches screen 13. Screen 13 is attached to framework 10 via booms 12'. As in FIG. 7, screen 13 can be easily rotated above the user's head if the user needs to have an unobstructed view of his/her surroundings. Screen 13 is shown divided so that two different stereoscopic pictures could be viewed simultaneously. Also, this variation could be set up as a "VIRTUAL VISION" apparatus with the video display being attached to either member 15 or 16, depending on the user's dominant eye, and screen 13 would then be a reflective screen.

Figure 9:
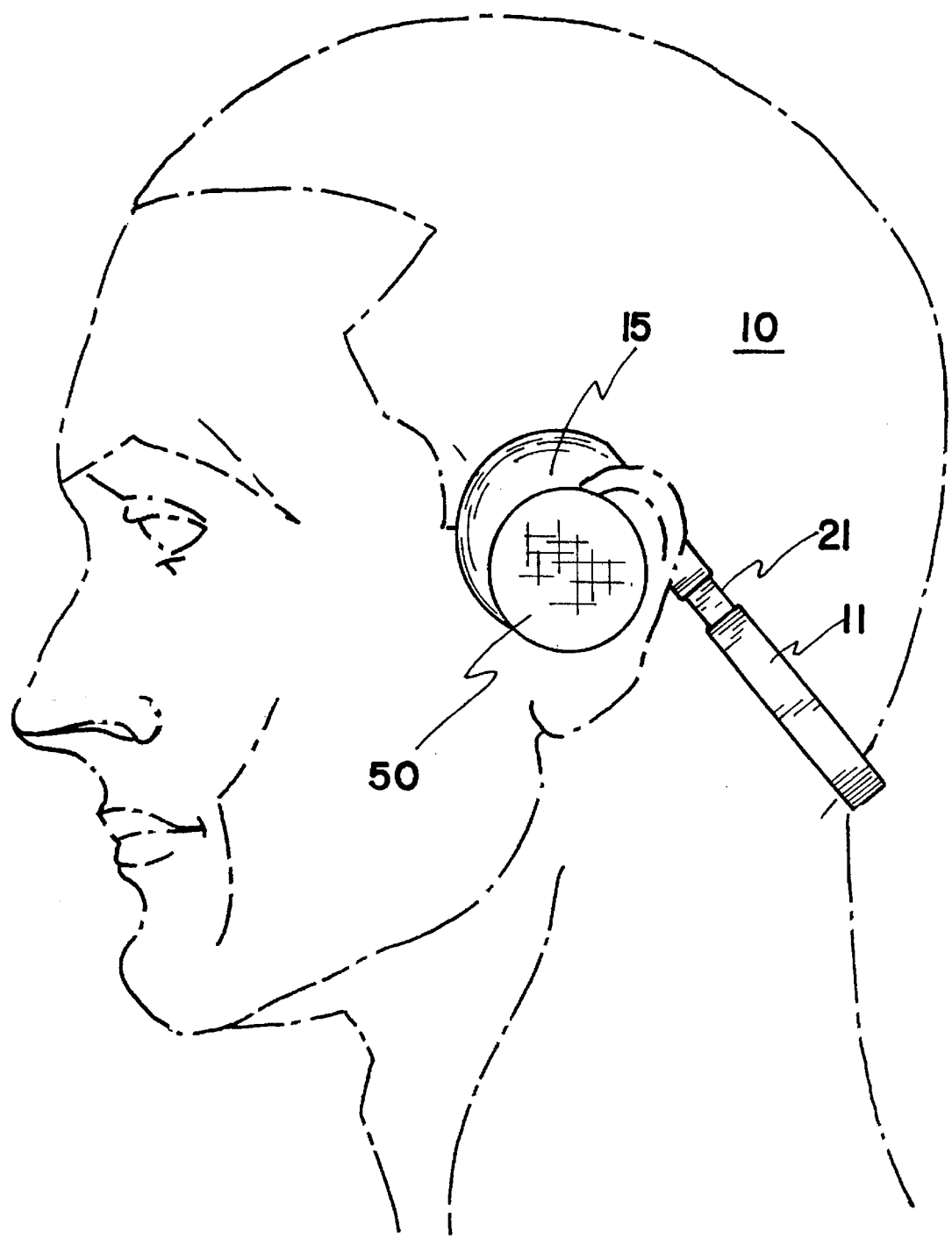
FIG. 9 is an isometric view of the headset framework adapted to carry stereo headphones.

FIG. 9 is an isometric view of the headset framework adapted to carry stereo headphones. Ear supported members 15 and 16 (not shown) are adapted to carry high fidelity speakers 50 which can be placed adjacent to the ears. The molding holding the speakers is integral with the molding forming the ear supported members 15 and 16. As in the previous examples, speakers 50 do not carry the weight of the framework 10 so that pressure on the user's ears is minimal. Framework 10 is adjusted via bands 21 so that nape supported member 11 is snugly fitted to the user's neck. Wiring (not shown) for the framework would preferably be internal and would exit from the rear, thus keeping any wires out of the user's way. In this position, the user is free to actively move about, exercising, running or jogging, skiing, etc. yet the stereo headphones will remain securely and comfortably in place.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. An ergonomic headset framework for carrying an electro-optical device on a user's head comprising:

left ear supported member, having anterior and posterior ends, and having a first surface shaped to conform to the cleft between the left auricle and the temporal bone region of the user's head and said surface extending anterior-inferiorly around the helix of the user's ear, at the forward end of said cleft;

right ear supported member, having anterior and posterior ends, and having a first surface shaped to conform to the cleft between the right auricle and the temporal bone region of the user's head and said surface extending anterior-inferiorly around the helix of the user's ear, at the forward end of said cleft;

nape supported member, having left and right ends continuous with the corresponding posterior ends of the left and right ear supported members, and having a surface shaped to conform to the user's neck region dorsal to the axis vertebra of the user;

resilient means in the nape supported member for urging said left and right ear supported members snugly against the corresponding left and right temporal regions of the user;

adjustment means operative between at least one ear supported member and the nape supported member, for adjusting the headset framework length between the ears and the nape of the neck, so that said headset framework will fit snugly on the user's head, supported by the auricle clefts and the nape of the user's neck; and device connecting means for carrying the electro-optical device, said device connecting means secured to at least one of said left and right ear supported members.

2. The headset framework of claim 1, wherein said device connecting means further comprises a boom disposed between one of said ear supported members and said electro-optical device, 3. The headset framework of claim 1, wherein said device connecting means further comprises pivot means, disposed between one of said ear supported members and said electro-optical device, for rotating said electro-optical device about an axis.

4. The headset framework of claim 1, wherein said electro-optical device is selected from the group consisting of a microphone, earphone, speaker, hearing aid, a mirror, liquid crystal screen, a lens, a light, a laser.

5. The headset framework of claim 1 further comprising a signal carrying cable attached to said framework.

6. The headset framework of claim 1 further comprising:

a second surface on said left ear supported member, wherein said second surface is substantially identical to and in the same plane of said first surface and oriented 180 degrees opposite thereto, as a vertical mirror image of said first surface, and;

a second surface on said right ear supported member, wherein said second surface is substantially identical to and in the same plane of said first surface and oriented 180 degrees opposite thereto, as a vertical mirror image of said first surface; wherein said headset framework can be worn interchangeably by the user with the right ear supported member supported by the left ear of the user and the left ear supported member supported by the right ear of the user.

7. The headset framework of claim 6 further comprising a microphone device carried on one ear supported member and an earphone carried on the other ear supported member, wherein said headset framework can be worn by the user either with the earphone on the right ear and the microphone extending from the left ear or with the earphone on the left ear and the microphone extending from the right ear.

8. The headset framework of claim 6, wherein said electro-optical device is selected from the group consisting of a microphone, earphone, speaker, hearing aid, a mirror, liquid crystal screen, a lens, a light, a laser.

9. The headset framework of claim 1, wherein said device connecting means further comprises an attachment surface adjacent to the anterior end of at least one of said ear supported members, dimensioned to correspond in size to a clip on a pilot's removable attachable communication boomset comprising a flexible, adjustable boom microphone and an earpiece.

10. The headset framework of claim 1, wherein said nape supported member further comprises an electro-optical component.

11. The headset framework of claim 10, wherein said electro-optical component further comprises a first control knob oriented in a first sagittal plane relative to said user and a second control knob oriented in a second sagittal plane relative to said user.

12. The headset framework of claim 11, wherein said electro-optical component further comprises a flexible antenna extending distally from said component, such that said antenna is substantially vertical when said user is in a standing position.

13. The headset framework of claim 10, wherein said electro-optical component is selected from the group consisting of a digital processor, audio amplifier, audio cassette player, audio cassette recorder, radio receiver, radio transmitter, video amplifier, television receiver.

14. The headset framework of claim 11, wherein said electro-optical component is a radio in which the first said control knob adjusts the power and volume of said radio and the second said control knob tunes the frequency of said radio.

15. An ergonomic framework of a generally u-shaped configuration supported by the nape of the neck and both ears of the user when worn, and useful for selective incorporation of an electronic component and selective attachment of an audio input output device comprising:

ear cleft engaging segments at both ends of said framework, each of said ear cleft engaging segments having a first surface conformal with the cleft between the ear and its respective temporal bone region, each of said ear cleft engaging segments being forward of each ear and downward, to inhibit rearward displacement of said framework on the user's head;

a nape supported segment at the rear of the framework as worn, intermediate between and continuous with the rear of said ear cleft engaging segments of said framework, and the nape supported segment having a surface conformal with the neck region, dorsal to the axis cervical vertebra of the user;

resilient means in said nape supported segment for urging said ear cleft engaging segments snugly against the respective temporal bone regions of the user;

adjustment means operative on said nape supported segment for adjusting the length of said framework between the nape and the ears for optimum fit to the user's head;

said audio input output device selected from the group of audio visual communication devices consisting of a microphone, earphone, speaker, liquid crystal display, and reflective visual display; and device connecting means secured to at least one of said ear cleft engaging segments to bear the audio input output device.

16. The framework of claim 15, wherein the electronic component comprises audio visual information processing means integral with said nape supported segment, the audio visual information processing means being selected from the group consisting of a digital processor, audio amplifier, audio cassette player, audio cassette recorder, radio receiver, radio transmitter, video amplifier, television receiver.

17. The framework of claim 15 further comprising:

a second surface on both said ear cleft engaging segments, wherein the second surfaces are substantially identical to and in the same plane, as a vertical mirror image of said first surfaces, whereby said framework can be worn interchangeably by the user with the right ear engaging segment supported by the left ear of the user and the left ear engaging segment supported by the right ear of the user.

18. The framework of claim 15, wherein said device connecting means further comprises an attachment surface adjacent to the forward end of at least one of said ear cleft engaging segments, dimensioned to correspond in size to a clip on a pilot's removably attachable communication boomset comprising a flexible, adjustable boom microphone and an earpiece.

* * * * *